United States Patent
Inoue et al.

(10) Patent No.: US 9,684,223 B2
(45) Date of Patent: Jun. 20, 2017

(54) HIGH EFFICIENCY FIBER OPTICAL PARAMETRIC OSCILLATOR

(71) Applicants: CANON KABUSHIKI KAISHA, Tokyo (JP); THE ARIZONA BOARD OF REGENTS ON BEHALF OF THE UNIVERSITY OF ARIZONA, Tuscon, AZ (US)

(72) Inventors: Yukihiro Inoue, Tucson, AZ (US); Dmitry Churin, Tucson, AZ (US); Khanh Kieu, Tucson, AZ (US)

(73) Assignees: Canon Kabushiki Kaisha, Tokyo (JP); ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 117 days.

(21) Appl. No.: 14/616,531

(22) Filed: Feb. 6, 2015

(65) Prior Publication Data

US 2016/0231640 A1    Aug. 11, 2016

(51) Int. Cl.
 *G02F 1/39* (2006.01)
 *H01S 3/00* (2006.01)
 (Continued)

(52) U.S. Cl.
 CPC ............ *G02F 1/395* (2013.01); *H01S 3/0092* (2013.01); *H01S 3/06758* (2013.01); (Continued)

(58) Field of Classification Search
 CPC .......... G02F 1/39; G02F 1/395; G02F 1/3519; H01S 3/00; H01S 3/067; H01S 3/06758
 See application file for complete search history.

(56) References Cited

U.S. PATENT DOCUMENTS 4,258,336 A * 3/1981 Fletcher .................. G01C 19/66
356/461

5,513,194 A * 4/1996 Tamura ............... H01S 3/06791
372/18

(Continued)

FOREIGN PATENT DOCUMENTS

WO   2004049056 A1   6/2004
WO   2005053119 A1   6/2005
WO   2013144600 A2   10/2013

OTHER PUBLICATIONS

Erin S. Lamb, Simon LeFrancois, Minbiao JI, William J. Wadsworth, X. Sunney Xie, Frank W. Wise, Fiber Optical Parametric Oscillator for Coherent Anti-Stokes Raman Scattering Microscopy, Author Manuscript, NIH Public Access, NIHMSID: NIHMS536253, Oct. 15, 2013, National Center for Biotechnology Information, U.S. National Library of Medicine, Bethesda MD, Oct. 15, 2013.

(Continued)

*Primary Examiner* — Daniel Petkovsek
(74) *Attorney, Agent, or Firm* — Canon U.S.A., Inc. IP Division

(57) ABSTRACT

An optical apparatus that includes an optical source that generates a first optical pulse with a first optical wavelength. The optical apparatus also includes an optical amplifier that outputs an amplified pulse. The optical apparatus also includes a first waveguide that is connected to the optical amplifier and a second waveguide. Wherein the second waveguide converts the energy of the amplified pulse into energy of a second pulse that has a second optical wavelength different from the first optical wavelength. Wherein, the following equation is satisfied: $L\_min \leq L \leq \pi/\gamma P$. In which a length of the first waveguide is L, a nonlinear coefficient of the first waveguide is $\gamma$, a peak power of the amplified pulse as it is received by the first waveguide is P, and a minimum length of the first waveguide is L_min or L is equal to zero.

7 Claims, 11 Drawing Sheets

(51) Int. Cl.
*H01S 3/067* (2006.01)
*H01S 3/16* (2006.01)
*H01S 3/23* (2006.01)

(52) U.S. Cl.
CPC ...... *G02F 2001/392* (2013.01); *H01S 3/0064* (2013.01); *H01S 3/0078* (2013.01); *H01S 3/1608* (2013.01); *H01S 3/1618* (2013.01); *H01S 3/2333* (2013.01)

(56) References Cited

U.S. PATENT DOCUMENTS

| | | | |
|---|---|---|---|
| 5,734,665 A * | 3/1998 | Jeon | H01S 3/067 372/6 |
| 5,926,492 A * | 7/1999 | Yoshida | H01S 3/06791 372/18 |
| 6,219,363 B1 | 4/2001 | Fix et al. | |
| 6,958,855 B2 | 10/2005 | Kumar et al. | |
| 7,898,731 B2 | 3/2011 | Sharping et al. | |
| 8,040,929 B2 | 10/2011 | Imeshev et al. | |
| 8,233,807 B2 * | 7/2012 | Cai | H04B 10/2935 398/148 |
| 8,477,410 B2 | 7/2013 | Hodgson et al. | |
| 8,768,118 B2 | 7/2014 | Sacks et al. | |
| 8,867,584 B2 | 10/2014 | Dunn et al. | |
| 8,902,495 B2 | 12/2014 | Clowes et al. | |
| 8,934,509 B2 | 1/2015 | Savage-Leuchs et al. | |
| 9,140,959 B2 * | 9/2015 | Kieu | G02F 1/395 |
| 2009/0041062 A1 * | 2/2009 | Liu | H01S 3/0057 372/6 |
| 2014/0023098 A1 | 1/2014 | Clarkson et al. | |
| 2015/0015938 A1 | 1/2015 | Kieu et al. | |

OTHER PUBLICATIONS

Markus Henriksson, Lars Sjöqvist, Valdas Pasiskevicius, Fredrik Laurell, Cavity Length Resonances in a Singly Resonant Optical Parametric Oscillator with a Volume Bragg Grating, Advanced Solid-State Photonics, San Diego, California United States, Jan. 31, 2010-Feb. 3, 2010, Lasers, Sources and Related Photonic Devices, OSA Technical Digest Series, paper AMB21, Optical society of America, Washington DC, 2010.

Bill P.-P. Kuo, Nikola Alic, Paul F. Wysocki, Stojan Radic, Simultaneous Wavelength-Swept Generation in NIR and SWIR Bands Over Combined 329-nm Band Using Swept-Pump Fiber Optical Parametric Oscillator, Journal of Lightwave Technology, Feb. 15, 2011, 29(4):410-416, IEEE, Piscataway, NJ, 2011.

Thomas Gottschall, Tobias Meyer, Martin Baumgartl, Benjamin Dietzek, Jürgen Popp, Jens Limpert, Andreas Tünnermann, Fiber-Based Optical Parametric Oscillator for High Resolution Coherent Anti-Stokes Raman Scattering (CARS) Microscopy, Optics Express Sep. 3, 2014, 22(18):21921-21928, Optical society of America, Washington DC, 2014.

Lei Zhang, Sigang Yang, Xiaojian Wang, Doudou Gou, Hongwei Chen, Minghua Chen, Shizhong Xie, High-Efficiency All-Fibre Optical Parametric Oscillator Based on Photonic Crystal Fibres Pumped by Ytterbium-Doped Fibre Laser, Electronics Letters, Apr. 10, 2014, 50(8):624-626, Institution of Engineering and Technology, Stevenage, UK, Apr. 10, 2014.

T. N. Nguyen, K. Kieu, A. V. Maslov, M. Miyawaki, N. Peyghambarian, Normal Dispersion Femtosecond Fiber Optical Parametric Oscillator, Optics Letters, Sep. 15, 2013, 38(18):3616-3619, Optical society of America, Washington DC, 2013.

Martin Baumgartl, Thomas Gottschall, Javier Abreu-Afonso, Antonio Díez, Tobias Meyer, Benjamin Dietzek, Manfred Rothhardt, Jürgen Popp, Jens Limpert, Andreas Tünnermann, Alignment-Free, All-Spiced Fiber Laser Source for CARS Microscopy Based on Four-Wave-Mixing, Optics Express, Aug. 29, 2012, 20(19):21010-21018, Optical Society of America, Washington DC, 2012.

K. Kieu, R. Jason Jones, N. Peyghambarian, Generation of Few-Cycle Pulses From an Amplified Carbon Nanotube Mode-Locked Fiber Laser System, IEEE Photonics Technology Letters, Oct. 15, 2010, 22(20):1521-1523, IEEE Photonics Society, Piscataway, NJ, 2010.

Splicing Single Mode PCFs, NKT Photonics Application Note V1.0, Nov. 2009, NKT Photonics, Birkerød, DK, 2009.

* cited by examiner

HIGH EFFICIENCY FIBER OPTICAL PARAMETRIC OSCILLATOR

BACKGROUND

Field of Art

This disclosure generally relates to fiber based optical parametric oscillators.

Description of the Related Art

Light sources based on optical parametric interaction are of significant interest because they provide access to laser wavelengths that existing gain materials based on electronic transitions cannot provide. An optical parametric oscillator (OPO) can be realized by exploiting the $\chi^{(2)}$ nonlinear optical response in a wide range of crystals or the $\chi^{(3)}$ nonlinear response in optical fibers.

Optical fiber based OPO (FOPO) are particularly attractive owning to their potential in achieving low cost, alignment-free and compact laser systems while still providing very wide tuning range and high power operation.

The operation of FOPOs is in essence based on degenerated four-wave-mixing (FWM) wherein two pump photons interact with the fiber to generate a signal photon and an idler photon. The exact frequencies of the signal and idler photons are defined by the phase matching condition which depends on the pump laser wavelength, its peak power as well as the dispersion profile of the optical fiber.

In the prior art, a wavelength-swept FOPO has been constructed which includes a wavelength swept pump laser. The wavelength swept pump laser was programmed to generate a linear sweep of the pump wavelength. The pump wave was then amplified by a first erbium-doped fiber amplifier (EDFA). Next, a Mach-Zehnder modulator (MZM) was used to generate pulses with low duty ratio. The pump pulses were then amplified by a second EDFA which acted as a pre-amplifier. The pre-amplifier was then followed by a third EDFA which acted as a booster amplifier. A high speed voltage-controlled tunable Fabry-Perot filter (FP) which was controlled by an arbitrary wavelength generator (AWG), was inserted between the pre-amplifier and the booster amplifier to reject the amplified spontaneous emissions (ASE) from the pre-amplified and thus mitigated the gain tilt in the booster amplifier. The AWG was synchronized with the wavelength swept pump laser such that output of the booster amplifier was a high power fiber coupled swept laser.

The output of the booster amplifier was then injected into a FOPO ring. This was done by combining the output of the booster amplifier with the lasing light of the FOPO ring at 1.3 μm through a first wavelength division multiplexer WDM coupler. The parametric gain medium was provided by a 100 meter (m) spool of Dispersion shifted fiber (DSF) with a zero-dispersion wavelength (ZDW) of 1565.7 nm and dispersion slope of 0.07 ps/nm/km. The DSF was followed by a first 1% tap, the 1% port of the first 1% tap was used monitor the DSF output. The 99% port of the first 1% tap was fed into a second WDM coupler. One port of the second WDM coupler was used to dump the residual pump and a 1.9 μm idler. A second port of the second WDM coupler was coupled into an Optical Delay Line (ODL) which was used to adjust the length of the FOPO ring resonating cavity. A polarization controller was placed after the ODL to control the polarization state of the FOPO. A second 1% tap was placed after the polarization controller. The 1% port of the second 1% tap was used to characterize the lasing wave output of the FOPO. The 99% port of the second 1% tap was fed into the first WDM coupler thus completing the FOPO ring resonating cavity.

As a pump light which has a high peak power is coupled into the parametric gain medium in the FOPO cavity, self-phase-modulation (SPM) occurs in the fiber which connects the gain fiber and the parametric gain medium. As a result, spectrum bandwidth of the pump light is broadened, and the conversion efficiency from pump light to signal light is decreased. Thus, it becomes more difficult to achieve high peak power of signal light.

FIG. 1 is an illustration of a typical FOPO light source 100 in which the distance the distance between the linear gain medium and the parametric gain medium is highlighted. A light source 100 is pumped by a seed laser 102. The seed laser 102 is spliced to a first polarization controller 106a. The first polarization controller 106a is spliced to a C port of a first wavelength division multiplexer (WDM) coupler 108a. The first WDM coupler 108a may be a C/L band fused fiber coupler. The multiplexed port of the first WDM coupler 108a is spliced to a signal port of a second WDM coupler 108b. The second WDM coupler 108b may be a 980/1550 fused fiber coupler. A first 980 nm pump laser 110a is connected to a pump port of the second WDM coupler 108b. The multiplexed port of the fused fiber coupler is coupled to an Er-doped fiber (EDF) 112. The EDF 112 is spliced to a multiplexed port of a third WDM coupler 108c. The third WDM coupler 108c may be a 980/1550 fused fiber coupler. A second 980 nm pump laser 110b is connected to a pump port of the third fused fiber coupler 108c. The pulse train from the seed laser is amplified by an Er-doped fiber amplifier (EDFA), which is described above is located inside the FOPO cavity.

The output of the EDFA exits the signal port of the third WDM 108c, which is spliced to dispersion shifted fiber (DSF) 114 which is used as the parametric gain medium. The output of the DSF 114 is spliced to an input port of a power splitter 116. The power splitter 116 may be a fused fiber coupler. The power splitter may have a 90%/10% split. The 90% output port may produce the output signal 104. The 10% output port may be spliced to an optical delay line (ODL) 118. The cavity length may be adjusted within a few centimeters using the fiber-coupled ODL 118. The output of the ODL 118 may be spliced to a polarization controller 106b which may then be spliced to an L port of the first WDM coupler 108a, thus completing a resonant ring cavity for the FOPO.

The typical manufacturing process for fiber optic systems such as light source 100 which includes specialty fiber (DSF and EDF) is to pigtail the specialty fiber. This pigtailing process usually includes attaching standard fiber such as SMF-28 or an equivalent to the specialty fiber with a fusion splicer. A typical fusion splicer will include recipes for splicing standard fiber to standard fiber and splicing common specialty fibers to standard fiber. Recipes for splicing specialty fiber to standard fiber take into account the differing mode field diameters of the two fibers by forming a taper on one side of the splice. The recipes also take into account the different material properties and structure of the fibers.

The pigtailing process usually includes adding 0.5-1 meters of standard fiber to the specialty fiber. This allows for greater control over the performance of the device, by allowing active monitoring of the splice, separation of non-standard splicing workflow from the standard fiber splicing workflow, and allows for additional freedom in the placing of the splices, fiber optic components and gain fiber so as to minimize splice loss.

SUMMARY

One embodiment is an optical apparatus. The optical apparatus includes an optical source that generates a first optical pulse with a first optical wavelength. The optical apparatus also includes an optical amplifier that amplifies the first optical pulse and outputs an amplified pulse with the first optical wavelength. The optical apparatus also includes a first waveguide that is connected to the optical amplifier which receives the amplified pulse. The optical apparatus also includes a second waveguide that is connected to the first waveguide and receives the amplified pulse. Wherein the second waveguide converts the energy of the amplified pulse into energy of a second pulse while a relative center position of the second pulse for the amplified pulse is crossing a center position of the amplified pulse in a first direction, wherein the second pulse has a second optical wavelength different from the first optical wavelength. Wherein the amplifier, the first waveguide, and the second waveguide, and additional components; form an optical loop which feeds the second pulse back to the amplifier, the first waveguide, and the second waveguide. The optical apparatus also includes an output coupler to output a portion of the second pulse outside of the optical loop. Wherein, the following equation is satisfied: $L_{min} \leq L \leq \pi/\gamma P$. In which a length of the first waveguide is L, a nonlinear coefficient of the first waveguide is γ, a peak power of the amplified pulse as it is received by the first waveguide is P, and a minimum length of the first waveguide is $L_{min}$.

In another embodiment, the energy of the first pulse is converted to the energy of the second pulse by a parametric process.

In another embodiment, the first pulse is used as a pump wave and the second pulse is an idler wave or a signal wave.

In another embodiment, the second waveguide comprises a photonic crystal fiber or another highly nonlinear fiber.

In another embodiment, the optical amplifier includes at least one fiber selected from the group of: double clad gain fiber, polarization maintaining double clad gain fiber, single mode gain fiber, polarization maintaining gain fiber.

In another embodiment, the optical apparatus may further comprise a third waveguide after the coupler in the loop. Wherein a length of the third waveguide is "l", a pulse duration of the first pulse is "t", and a dispersion parameter of the second pulse is "D" in the third waveguide which satisfy the following equation:

$l \geq t/D$.

In another embodiment $L_{min}$ is 10 mm.

In another embodiment, is a fiber optic oscillator. In which a resonating cavity of the fiber optic oscillator includes a linear gain medium. In which a resonating cavity of the fiber optic oscillator also includes a non-linear gain medium. In which a resonating cavity of the fiber optic oscillator also includes a connection fiber that is connected to the linear gain medium and is connected to the non-linear gain medium which satisfies the following equation: $L_{min} \leq L \leq \pi/\gamma P$. Wherein a length of the connection fiber is L, a nonlinear coefficient of the connection fiber is γ, a peak power of the amplified pulse as it is received by the connection fiber is P, and a minimum length of the first waveguide is $L_{min}$.

In another embodiment, the linear gain medium is a double clad linear gain fiber or a polarization maintaining double clad linear gain fiber.

Another embodiment is a fiber optic oscillator. The fiber optic oscillator includes an input coupler for receiving a seed pulse. Wherein an optical wavelength at a peak intensity of the seed pulse is a first wavelength. The fiber optic oscillator also includes a fiber optic linear gain medium that receives the seed pulse and outputs an amplified pulse, wherein an optical wavelength at a peak intensity of the amplified pulse is the first wavelength. The fiber optic oscillator also includes a fiber optic non-linear gain medium which receives the amplified pulse and outputs a second pulse, wherein an optical wavelength at a peak intensity of the seed pulse is a second wavelength that is different from the first wavelength. The fiber optic oscillator also includes a power splitter that receives light from the fiber optic non-linear gain medium, wherein the power splitter sends a first portion of the light back into the fiber optic oscillator and outputs a second portion of the light. Wherein the fiber optic linear gain medium is fusion spliced directly to the fiber optic non-linear gain medium.

In another embodiment, the energy of the amplified pulse exiting the linear gain medium is converted into the energy of the second pulse by a parametric process within the non-linear gain medium.

In another embodiment, wherein the amplified pulse is used as a pump wave and the second pulse is an idler wave or a signal wave.

In another embodiment, the non-linear gain medium is a photonic crystal fiber or another highly nonlinear fiber.

In another embodiment, the linear gain medium is a double clad linear gain fiber or a polarization maintaining double clad linear gain fiber.

Another embodiment is a fiber optic oscillator. The resonating cavity of the fiber optic oscillator includes a linear gain medium. The resonating cavity of the fiber optic oscillator also includes a non-linear gain medium. The resonating cavity of the fiber optic oscillator also includes a plurality of optical components including a free space connection fiber that is used to connect the linear gain medium and to the non-linear gain medium which satisfies the following equation:

$L_{min} \leq \Sigma L_i \gamma_i P_i \leq \pi$

Wherein: i is an index to signify each of the plurality of optical components and a free space connection; $L_i$ is a length of each of the components or the free space component; $\gamma_i$ is a nonlinear coefficient of each of the components or the free space component; $P_i$ is a peak power of the amplified pulse as it is received by each of the components or the free space component; $L_{min}$ is a minimum length of a sum of all the plurality of optical components and the free space connection.

In another embodiment, the plurality of optical components includes: 2 GRIN lenses and $L_{min}$ is 9 mm.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments.

DESCRIPTION OF THE EMBODIMENTS

Embodiments will be described below with reference to the attached drawings. Like numbers refer to like elements throughout. Exemplary embodiments will be described in detail with reference to the drawings below. It shall be noted that the following description is merely illustrative and exemplary in nature, and is in no way intended to limit the disclosure and its applications or uses. The relative arrangement of components and steps, numerical expressions and numerical values set forth in the embodiments do not limit the scope of the disclosure unless it is otherwise specifically stated. Techniques, methods, and devices which are well known by individuals skilled in the art may not have been discussed in detail since an individual skilled in the art would not need to know these details to enable the embodiments discussed below. Further, an image photographing apparatus as disclosed in the following can be applied to an object to be inspected such as an eye to be inspected, skin, and internal organs.

Femtosecond (fs) Titanium:Sapphire (Ti:sa) lasers are a useful tool and are widely used in various biomedical and scientific applications. These fs Ti:sa lasers are expensive, bulky, and not easy to use. A compact, widely tunable FOPO, can provide similar performance to fs Ti:sa laser but at a much lower price, while being robust and easy to use.

Very wide wavelength tuning capability can be achieved with the use of parametric gain in glass optical fibers. Generation of light in the Ti:sa wavelength range (700-950 nm) can be achieved by pumping a FOPO with high energy picosecond pulses operating in the gain region of Yb-doped fibers. Pulse energy >10 nJ can be achieved by operating the FOPO in the normal dispersion regime (dissipative soliton regime).

The wavelength of the peak signal/idler gain in the FOPO shifts with an order of magnitude faster than the shift of the pump wavelength. Therefore, for higher FOPO efficiency it is required to have narrow bandwidth (<1 nm) picosecond pump source. The inventors have discovered that this may be achieved by inserting the main amplifier for the pump wave inside the FOPO cavity and minimizing the fiber length between the main amplifier and the parametric gain medium such as a single mode photonic crystal fiber (PCF). An example of a single mode PCF is LMA-5 by NKT Photonics. The inventors have determined that minimizing the fiber length between the main amplifier and the parametric gain medium is an effective way of minimizing the self-phase modulation of the pump pulses.

First Embodiment

Figure 1:
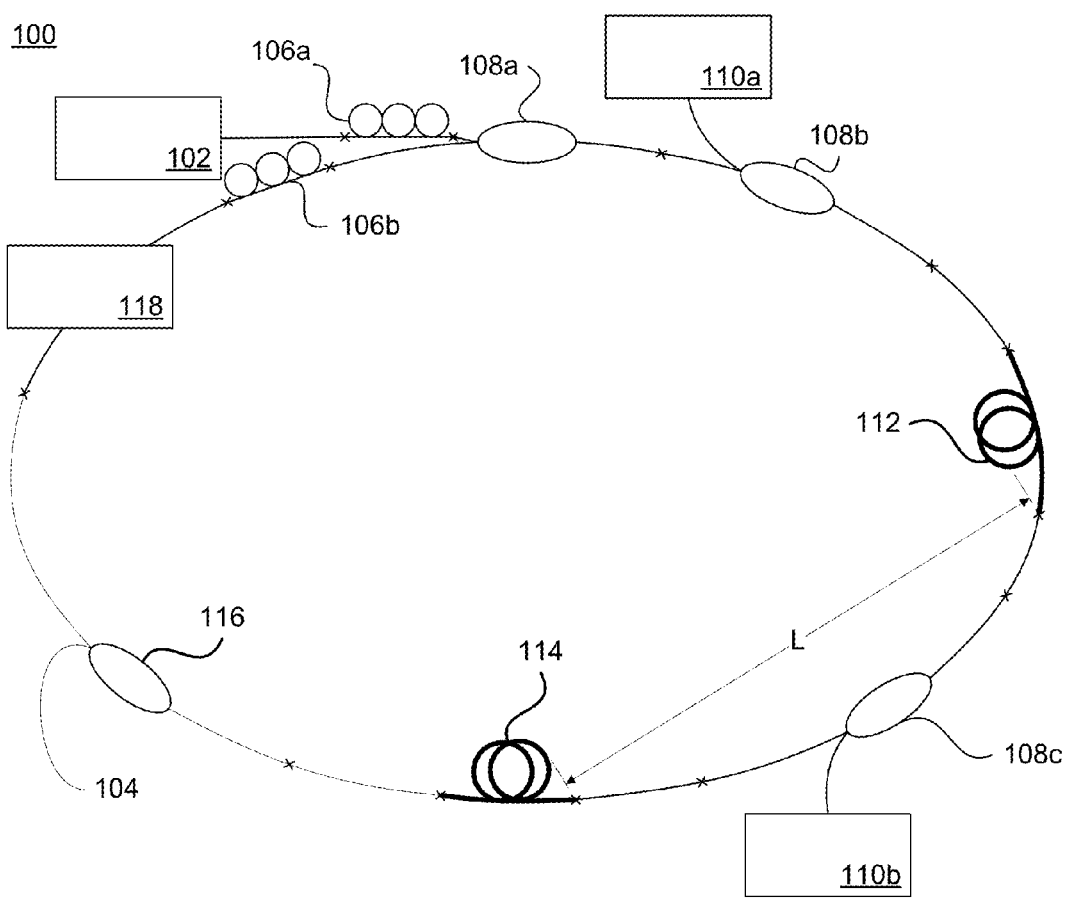
FIG. 1 is an illustration of a typical FOPO of the prior art.
Figure 2A:
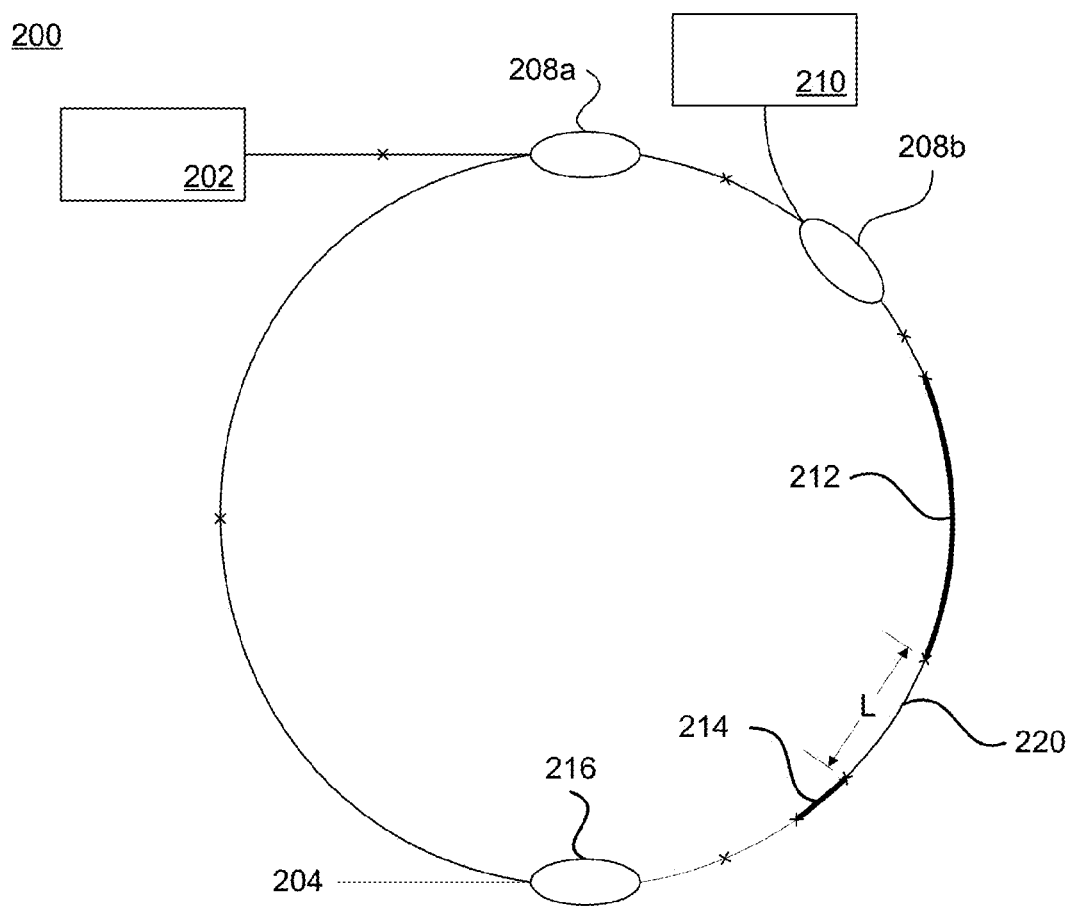
FIGS. 2A-B are illustrations of an embodiment.
Figure 2B:
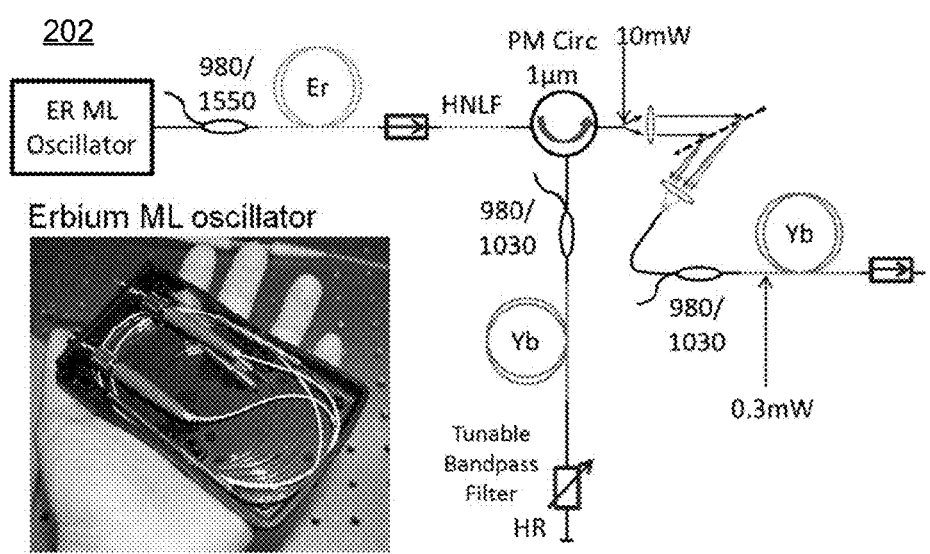

FIG. 2A is a first embodiment of a FOPO light source 200 in which the distance between the linear gain medium and the parametric gain medium is reduced and controlled to improve the performance of the light source 200. The light source 200 is pumped by a seed laser 202 an example of which is illustrated in FIG. 2B. The seed laser 202 is spliced to a first port of a first wavelength division multiplexer (WDM) coupler 208a. The first WDM coupler 208a may be a 800/1030 band fused fiber coupler. The multiplexed port of the first WDM coupler 208a is spliced to a signal port of a second WDM coupler 208b. The second WDM coupler 208b may be a fused fiber coupler. A pump laser 210 is connected to a pump port of the second WDM coupler 208b. The multiplexed port of the fused fiber coupler is coupled to a linear gain fiber 212. The linear gain fiber 212 may be a Ytterbium (Yb) doped gain fiber. Other types of dopants may be used. The linear gain fiber 212 may be a double clad linear gain fiber and the second WDM coupler 208 may be replaced with a pump combiner that combines a multimode pump with a single mode signal. The pump combiner may be fused fiber combiner. The pump combiner may maintain the polarization state of the single mode signal. The pump combiner may be a micro-optics based combiner. The linear gain fiber 212 may also be a single mode linear gain fiber or a polarization maintaining single mode linear gain fiber. The linear gain fiber 212 is spliced to a connection fiber 220. The connection fiber is spliced to a parametric gain fiber 214. An example of parametric gain fiber 214 is PCF. Other examples of parametric gain fiber 214 include Highly Non-linear Fiber, Dispersion shifted fiber, and any type of fiber that has a higher than typical nonlinear optical response and will provide the parametric gain then the other fibers in the FOPO ring. The output of the parametric gain fiber 214 is spliced to an input port of a power splitter 216. The power splitter 216 may be a fused fiber coupler. The power splitter may have a 90%/10% split. The 90% output port may produce the output signal 204. The 10% output port may be spliced to an second port of the first WDM coupler 208a, thus completing a resonant ring cavity for the FOPO.

In one embodiment, all of the fiber in the resonating ring cavity of the FOPO is polarization maintaining fiber. In another embodiment, all of the fiber in the resonating ring cavity of the FOPO is polarization maintaining fiber except for the parametric gain fiber 214, and the parametric gain fiber is kept short enough that the polarization of the light is still well controlled. In another embodiment, a polarization controller is added to the resonating ring cavity, preferably between the output coupler 216 and the second port of the first WDM coupler 208a. In another embodiment, a polarization controller is added to an input of the resonating ring cavity, preferably between the first port of the first WDM coupler 208a and the seed laser 202.

An example of a seed laser 202 as illustrated in FIG. 2A. The seed laser 202 may include an Erbium (Er) doped mode locked (ML) oscillator. Er ML oscillator may be spliced to a signal port of a third WDM coupler such as a 980/1550 fused fiber coupler. A pump laser may be spliced to the pump port of the third WDM coupler. The multiplexed port of the third WDM coupler may be coupled to a first end of an Er doped fiber. A second end of the Er doped fiber may be coupled to an input of a first isolator. An output of the first isolator may be coupled to HNLF fiber. The output of the HNLF may be coupled to a first port of the PM circulator that operates in the 1 μm band. Light from the first port of the circulator exits a second port of the circulator and is spliced to a signal port of a fourth WDM coupler which may be a 980/1030 coupler. A pump laser may be spliced to a pump port of the fourth WDM coupler. The multiplexed port of the fourth WDM coupler may be coupled to an input of a second Yb gain fiber. The output of the second Yb gain fiber is a coupled to a tunable band pass filter which is then coupled to a reflector. The reflector reflects the light back through the tunable band pass filter the second Yb gain fiber the fourth WDM coupler and back into the second port of the circulator. Light that enters the second port of the circulator is then coupled to a third port of the circulator. Light exiting the third port of the circulator may be a short pulse that is around 10 mW. The chirp of the light exiting the circulator may be adjusted with a diffraction grating or some other method, after which it is coupled to a single port of a fifth WDM coupler which may be a 980/1030 coupler. A pump laser may be spliced to a pump port of the fifth WDM coupler. The signal light exiting a multiplexer port of the fifth WDM may be around 0.3 mW. The multiplexer port of the fifth WDM coupler may be a coupled to a third Yb gain fiber. The output of the third Yb Gain fiber may be coupled to an input of a second isolator. The output of the second isolator is the output of the seed laser 202 which is then coupled to FOPO ring via the first port of the first WDM coupler 208a as illustrated in FIG. 2A.

An embodiment as described above can be used to produce an all PM fiber normal dispersion femtosecond optical parametric oscillator pumped by a Yb-doped fiber laser. This embodiment operating in the normal dispersion regime, alternative embodiments may be operated in other dispersion regimes. The normal dispersion regime allows output power scaling while avoiding pulse breakup. The output signal or idler pulses from the FOPO 200 are highly chirped but can be compressed to close to transform limit ensuring high peak power. Compression can be done using free space optical systems or all fiber systems as PCF fiber. An embodiment such as the one described above can achieve over 300 nm total tuning range (850-950 nm and 1100-1300 nm) with the output pulse energy well above 1 nJ. The source 200 is useful for many applications including multiphoton imaging. An alternative embodiment my include an isolator (not shown) within the resonating ring such as between the power splitter 216 and the first WDM coupler 208a.

The wavelength of the peak signal/idler gain in a FOPO such as in light source 200 can shift with an order of magnitude faster than a shift of the pump wavelength. Therefore, for to increase the FOPO efficiency it is helpful to have a narrowband (<1 nm) picosecond pump source. This can be achieved by inserting a main amplifier 212 for the pump wave inside the FOPO ring cavity to minimize the fiber length L between the amplifier 212 and the parametric gain fiber 214. This is helpful for minimizing the self-phase modulation of the pump pulses and preventing them from broadening.

The gain fiber 212 which amplifies the peak power of the pump light is inserted into the FOPO cavity, and a length L of the connection fiber 220 which connects the gain fiber 212 and the parametric gain fiber 214 should satisfy the following equation (1) to obtain the best performance.

$$0 \le L \le \frac{\pi}{\gamma P} \qquad (1)$$

In equation (1) L is a length of the connection fiber 220, γ is nonlinear coefficient of the connection fiber, P is peak power of the pump light as it enters the connection fiber 220. As a result, self-phase-modulation (SPM) is suppressed in the connection fiber, so narrow spectrum bandwidth of pump light is kept until it's coupled into the parametric gain fiber 214. Thus, conversion efficiency from pump light to signal light is increased, so it is possible to get high peak power of signal light.

When L is zero, there is no connection fiber 220, and the parametric gain fiber 214 is spliced directly to the gain fiber 212. Splicing the parametric gain fiber 214 directly to the gain fiber 212. In most cases, fiber suppliers will supply splicing recipes for specific fibers to typical fiber. When splicing the parametric gain fiber to another specialty fiber, the recipe is tweaked and optimized for the lowest insertion loss. For example, when the mode field diameter (MFD) of the gain fiber 212 is different from the MFD of the parametric gain fiber 214, the splice loss is mostly determined by the MFD mismatch. The MFD mismatch can be corrected by various methods including: thermal expanded core, tapering, core expansion by partially collapsing holes in PCF.

When L is non-zero but very short, there are practical considerations which can limit the length L to a minimum length $L_{min}$. The minimum length $L_{min}$ of the connection fiber 220 is limited by the splice sleeves and the chucks for holding the stripped fiber in the fusion splicer. The applicants have found that depending on the mechanical strength required of the splices the minimum length $L_{min}$ of the connection fiber is 10 mm but can increase to 20-30 mm depending on the application and the fusion splicer being used.

When L is non-zero but very short, there are practical considerations which can limit the length L to a minimum length $L_{min}$. The minimum length $L_{min}$ of the connection fiber 220 is limited by the splice sleeves and the chucks for holding the stripped fiber in the fusion splicer. The applicants have found that depending on the mechanical strength required of the splices the minimum length $L_{min}$ of the connection fiber is 10 mm but can increase to 20-30 mm depending on the application and the fusion splicer being used.

Equation (2) is a modification of equation (1) in which these practical considerations are taken into account.

$$L = 0; \text{ or} \qquad (2)$$
$$L_{min} \le L \le \frac{\pi}{\gamma P}$$

Experimental Results

In one embodiment, the seed laser 202 is a short pulse laser that may have a wavelength of around 1040 nm. The average power of the seed laser 202 may have an average power of 10 mW. The peak power of the seed laser 202 may be 40 W. The repetition rate of the seed laser 202 may be 50 MHz. The pulse duration of the seed laser 202 may be 5 ps. The spectral bandwidth of the seed laser 202 may be 0.3 nm. The linear gain fiber 212 may be Polarization maintaining double clad Ytterbium doped fiber. The length of the linear gain fiber 212 may be 1.2 m. After amplification by the linear gain fiber 212 the average power may be 1 W. After amplification by the linear gain fiber 212 the peak power may be 4 kW. The parametric gain fiber 214 may be polarization maintaining photonic crystal fiber. The zero dispersion wavelength of the parametric gain fiber 214 may be 1050 nm. The 3rd order dispersion of the parametric gain fiber 214 may be 6.71776 E-41 $s^3$/m. The 4th order dispersion of the parametric gain fiber 214 may be −9.83483 E-56 $s^4$/m. The nonlinear coefficient of the parametric gain fiber 214 may be 10 1/W·km. The length of the parametric gain fiber 214 may be 30 cm. The connection fiber 220 may be polarization maintaining fiber. The nonlinear coefficient of the connection fiber 220 may be 1.5 1/W·km. So as to satisfy equation (1) the length of connection fiber 220 in this embodiment is 10 cm. The wavelength of the output signal 240 may be 850 nm. The average power of the output signal 240 may be 150 mW. The peak power of the output signal 240 may be 1 kW. The repetition rate of the output signal 240 may be 50 MHz. The pulse duration of the output signal 240 may be 3 ps. The spectral bandwidth of the output signal 240 may be 15 nm.

Figure 3:
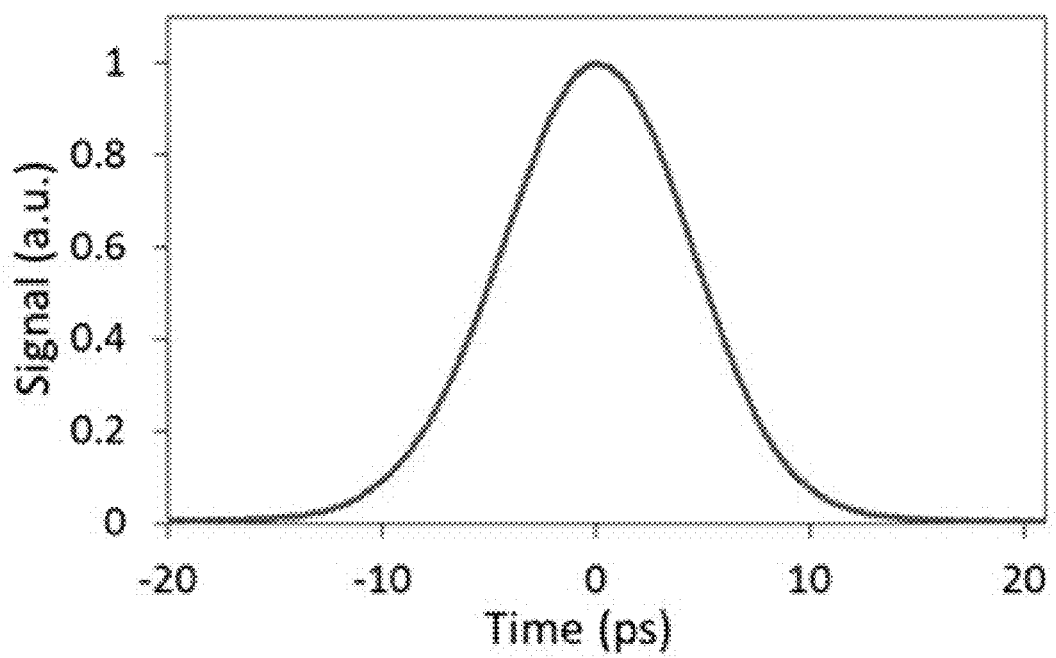
FIG. 3 is an illustration of an autocorrelation trace of a pump pulse which may be used to pump an embodiment.

FIG. 3 is an illustration of an autocorrelation trace of the pump pulse which was produced the seed laser 202 at the output of the second isolator in an embodiment.

Figure 4:
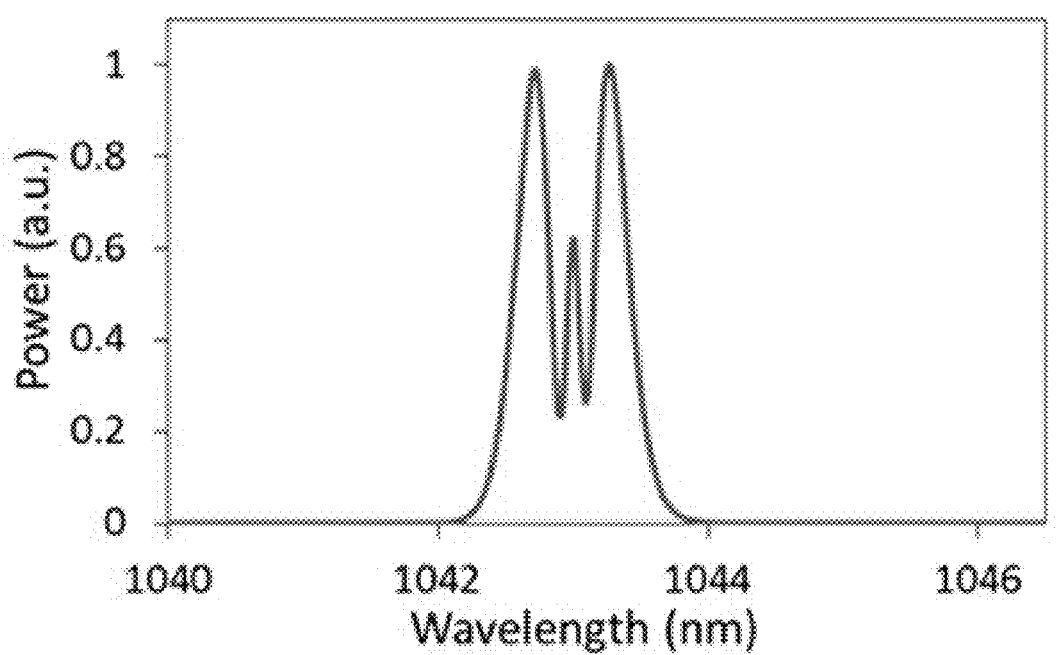
FIG. 4 is an illustration of a spectrum of a pump pulse which may be used to pump an embodiment.

FIG. 4 is an illustration of a spectrum of a pump pulse produced by the seed laser 202 at the output of the second isolator in an embodiment, it has an average power of 1.8 Watts (W) with 45 nano-Joules of energy (nJ).

Figure 5:
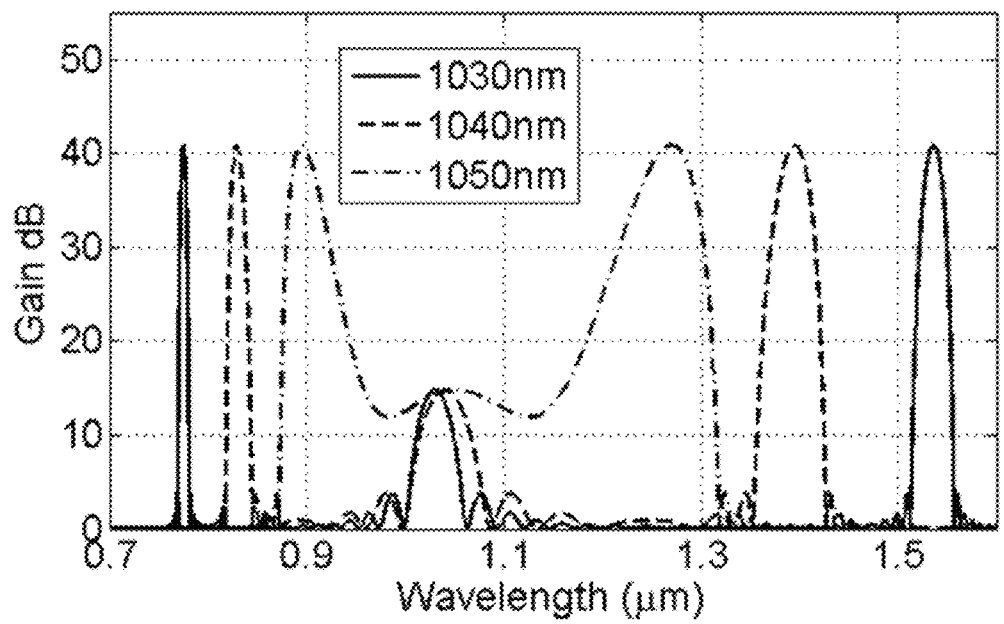
FIG. 5 is an illustration the calculated parametric gain of a fiber which may be used in an embodiment

FIG. 5 is an illustration the calculated parametric gain of 20 cm PCF fiber (Model number LMA5-PM manufactured by NKT Photonics) for various pump wavelengths when the peak pump power is 3 kW as used in an embodiment.

Figure 6:
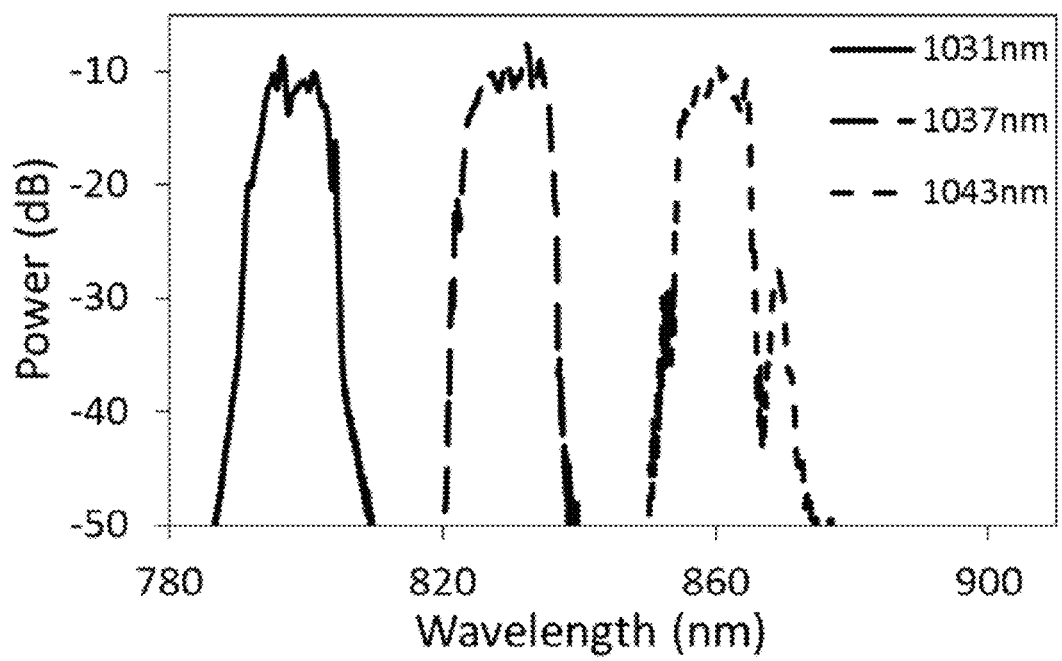
FIG. 6 is an illustration of the spectra of the resonant signal wave which may be generated in an embodiment.

FIG. 6 is an illustration of the spectra of the resonant signal wave generated from the FOPO 200 at different pump wavelengths as used in an embodiment.

Figure 7:
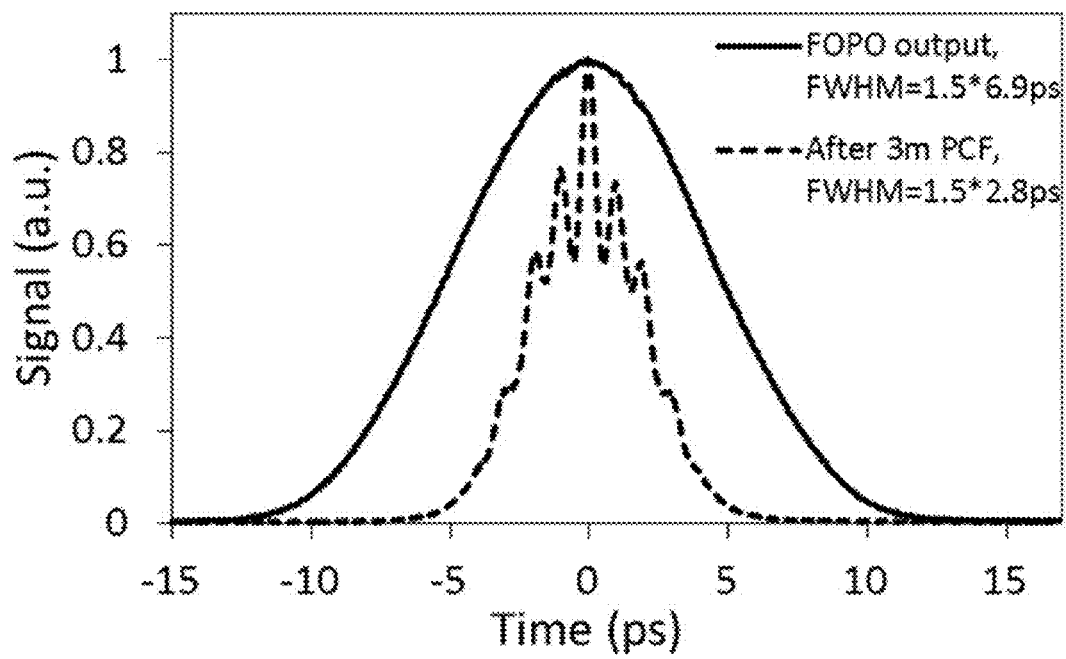
FIG. 7 is an illustration of an autocorrelation trace of the signal pulses at that may be an output of an embodiment.

FIG. 7 is an illustration of an autocorrelation trace of the signal pulses at the output of the FOPO 200 and after it has been compressed by using 3 meters of PCF fiber as used in an embodiment.

Figure 8:
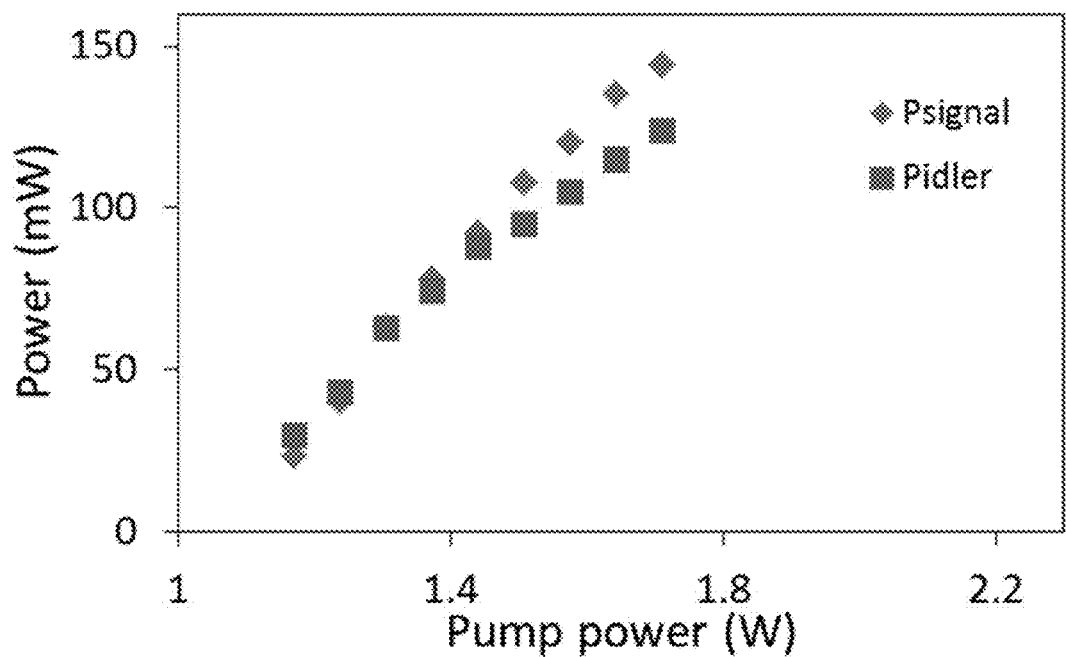
FIG. 8 is an illustration of signal and idler waves output powers vs. pump power which may represent an efficiency of an embodiment.

FIG. 8 is an illustration of signal and idler waves output powers vs. pump power represent an efficiency of an embodiment.

Figure 9:
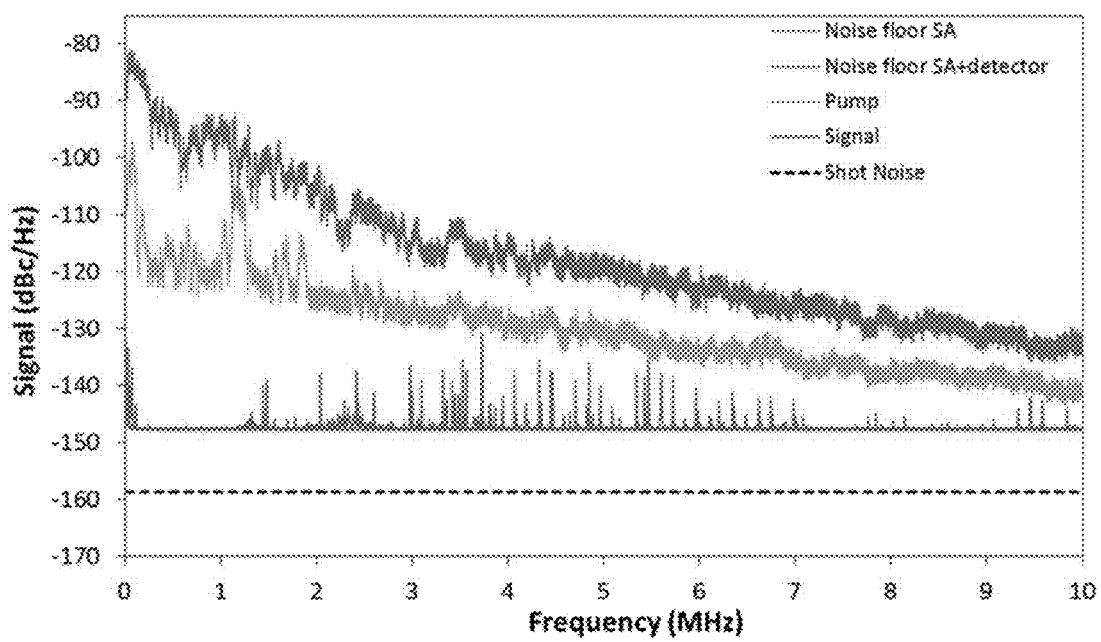
FIG. 9 is an illustration of noise of an embodiment

FIG. 9 is an illustration of Relative Intensity Noise (RIN) measurement of the pump laser and signal wave as used in an embodiment.

Simulation Results

Linear losses in the FOPO ring cavity can limit the ability to achieve much high efficiencies. Numerical simulation results indicate that eliminating linear losses can provide efficiencies close to 50%. The following parameters used for the simulation results illustrated in FIGS. 10-13: 25 nJ pump pulses at 1040 nm with 5 ps pulse duration; 35% feedback; 10 cm PCF length; and PCF dispersion ($\beta 2=1.449 \cdot 10-27$, $\beta 3=6.896 \cdot 10-41$, $\beta 4=-9.581 \cdot 10-56$, $\beta 5=2.0609 \cdot 10-70$).

Figure 10:
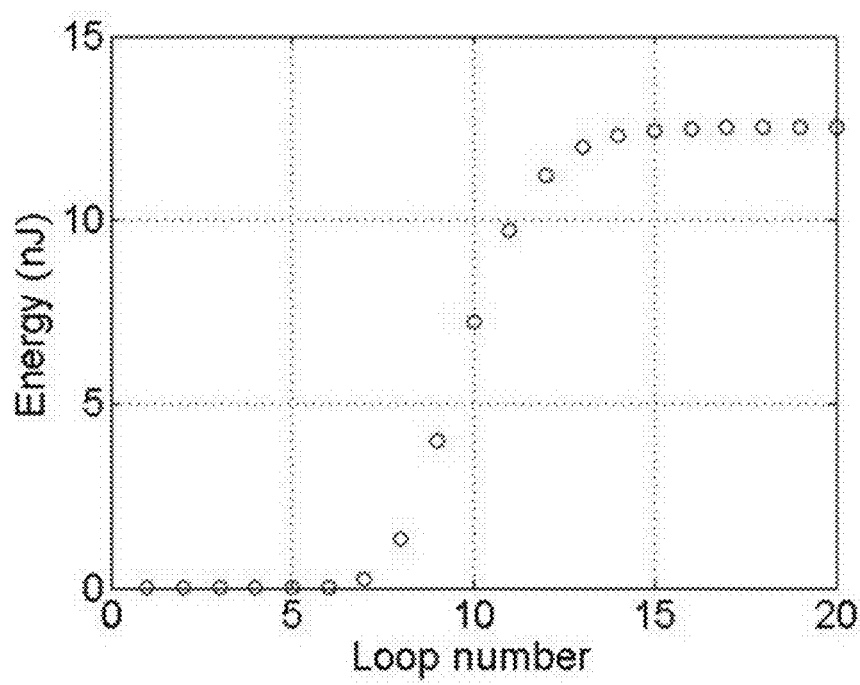
FIGS. 10-13 are illustrations of a simulation results of an embodiment.

FIG. 10 is an illustration of a simulation of signal pulse energy vs. loop number as used in an embodiment.

Figure 11:
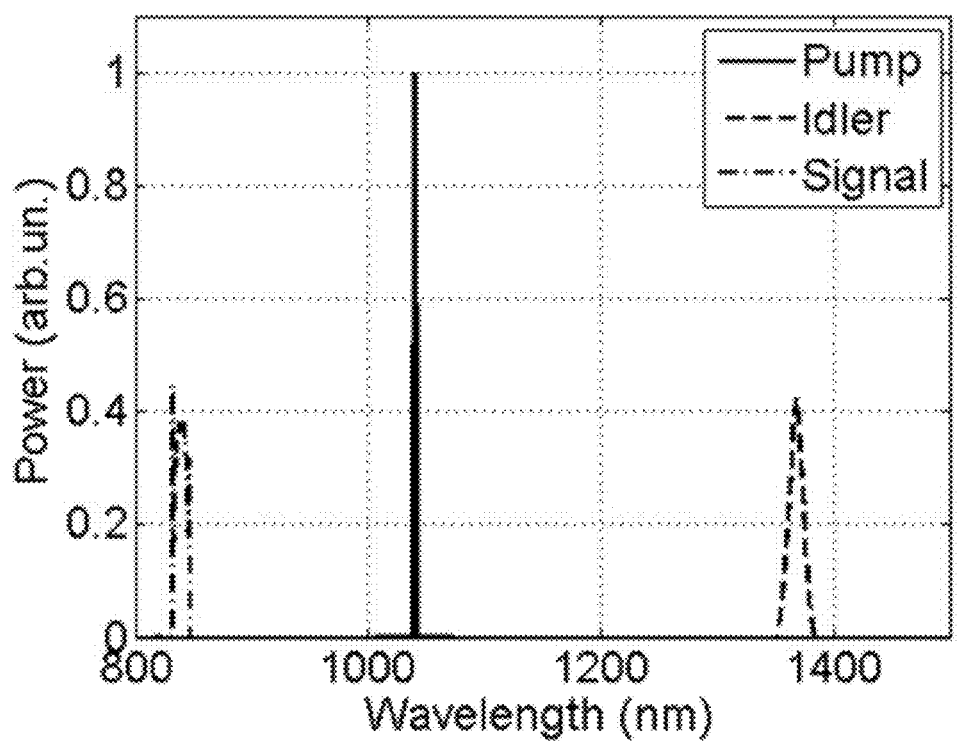

FIG. 11 is an illustration of a simulation of spectrum at the output of the FOPO as used in an embodiment.

Figure 12:
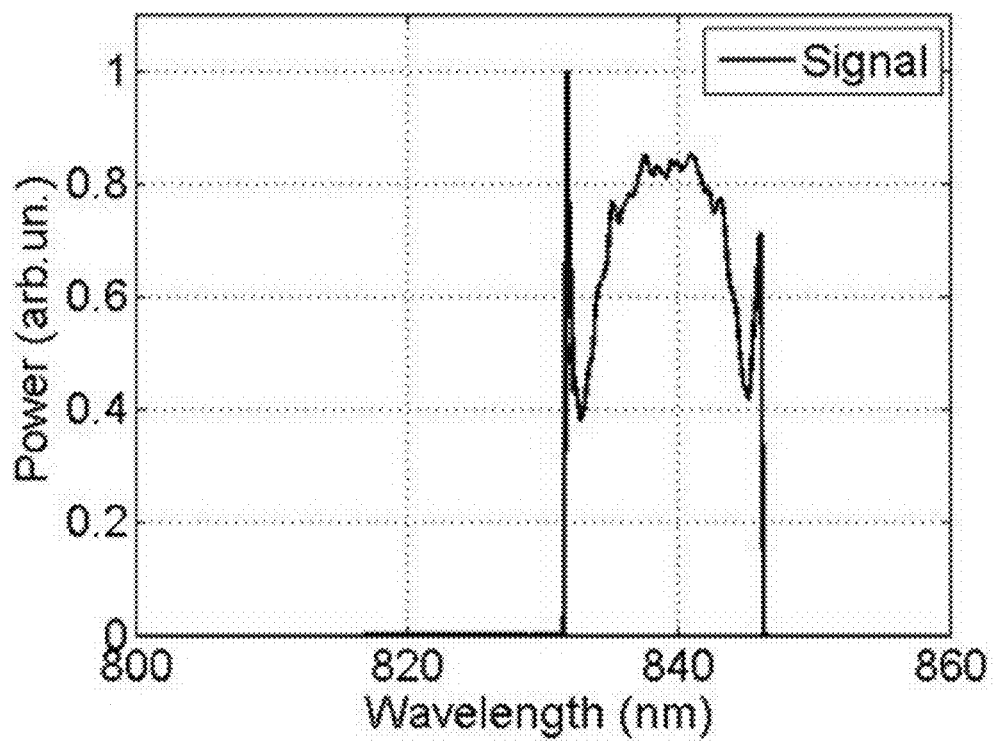

FIG. 12 is an illustration of a simulation of a spectrum of a signal pulse as used in an embodiment.

Figure 13:
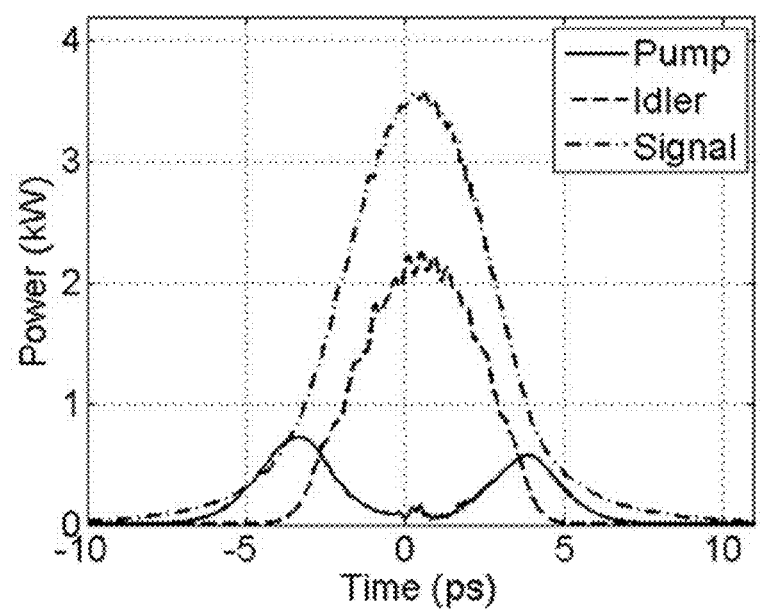

FIG. 13 is an illustration of a simulation Pulse shape of the pump, signal, and idler pulses used in an embodiment.

Second Embodiment

Figure 14:
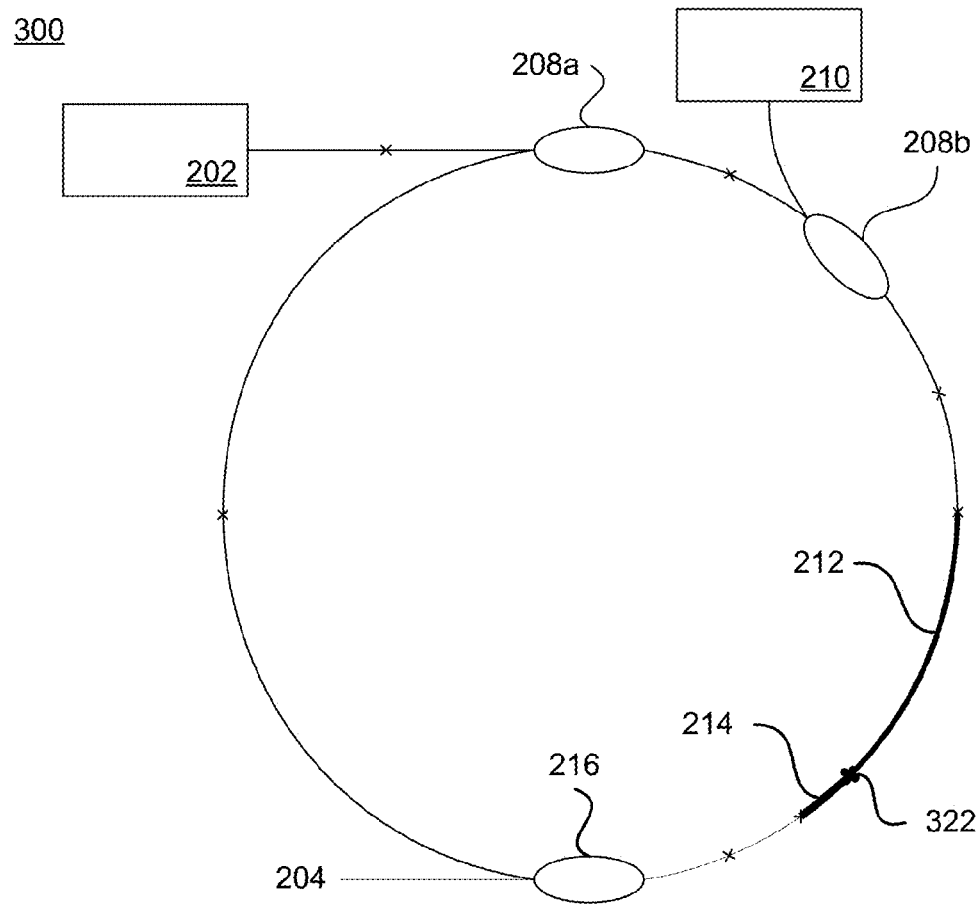
FIG. 14 is an illustration of a second alternative embodiment.

FIG. 14 is a second embodiment of a FOPO light source 300 and is similar to FOPO light source 200 except that the distance between the linear gain medium and the parametric gain medium is zero. The light source 300 is pumped by a seed laser 202 an example of which is illustrated in FIG. 2B. The seed laser 202 is spliced to a first port of a first wavelength division multiplexer (WDM) coupler 208a. The first WDM coupler 208a may be a 800/1030 band fused fiber coupler. The multiplexed port of the first WDM coupler 208a is spliced to a signal port of a second WDM coupler 208b. A pump laser 210 is connected to a pump port of the second WDM coupler 208b. The multiplexed port of the fused fiber coupler is coupled to a linear gain fiber 212. The linear gain fiber 212 is spliced directly to the parametric gain fiber 214 with a special splice 322. The output of the parametric gain fiber 214 is spliced to an input port of a power splitter 216. The 90% output port may produce the output signal 204. The 10% output port may be spliced to an second port of the first WDM coupler 208a, thus completing a resonant ring cavity for the FOPO.

In the second embodiment 300 the linear gain fiber 212 is spliced directly to the parametric gain fiber 214 with a special splice 322, that has been specifically designed and optimized to work with these 2 specialty fibers.

Third Embodiment

Figure 15:
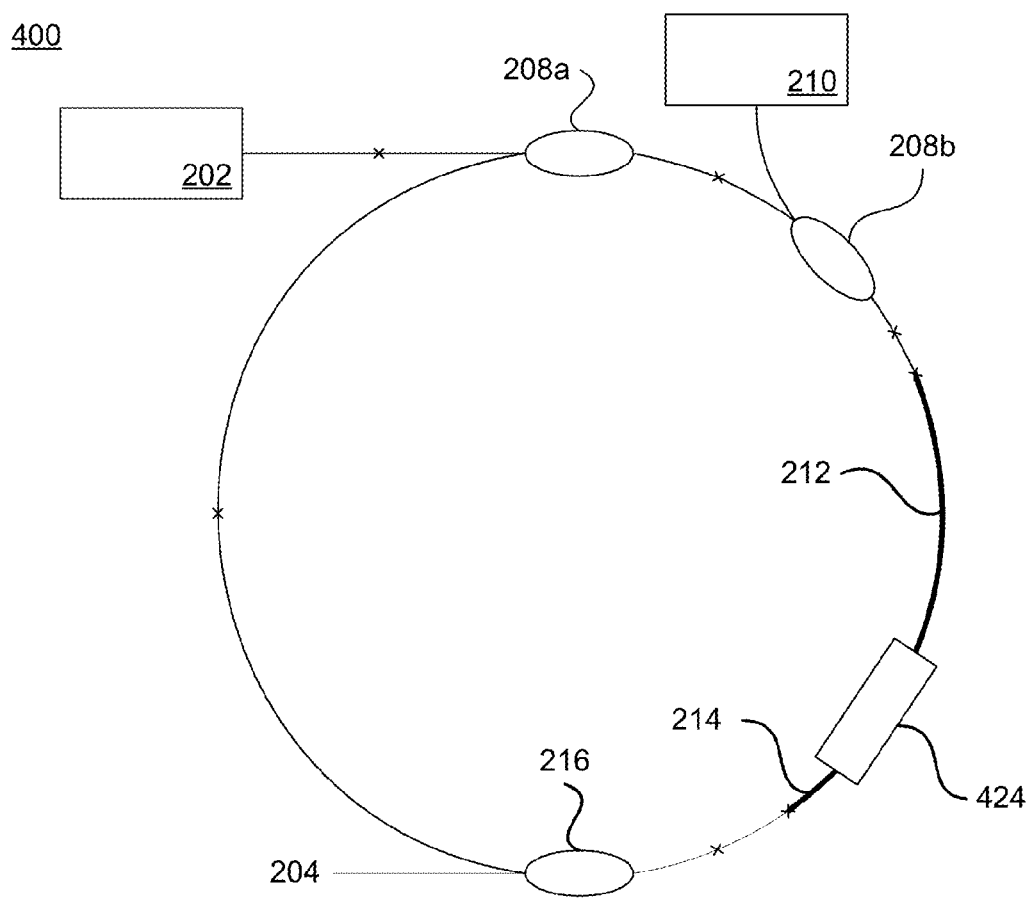
FIG. 15 is an illustration of a third alternative embodiment.

FIG. 15 is a third embodiment of a FOPO light source 400 and is similar to FOPO light source 200 except that the linear gain medium and the parametric gain medium are coupled together via a free space link. The light source 400 is pumped by a seed laser 202 an example of which is illustrated in FIG. 2B. The seed laser 202 is spliced to a first port of a first wavelength division multiplexer (WDM) coupler 208a. The first WDM coupler 208a may be a 800/1030 band fused fiber coupler. The multiplexed port of the first WDM coupler 208a is spliced to a signal port of a second WDM coupler 208b. A pump laser 210 is connected to a pump port of the second WDM coupler 208b. The multiplexed port of the fused fiber coupler is coupled to a linear gain fiber 212. The linear gain fiber 212 is free space optically coupled to the parametric gain fiber 214 via multiple optical components 422. The output of the parametric gain fiber 214 is spliced to an input port of a power splitter 216. The 90% output port may produce the output signal 204. The 10% output port may be spliced to a second port of the first WDM coupler 208a, thus completing a resonant ring cavity for the FOPO.

The multiple optical components 422 may include a first Graded Index (GRIN) lens which has been coupled to the linear gain fiber 212 and second GRIN lens which has been coupled to the parametric gain fiber 214. Equation 1, should be modified to take into account the multiple components and the space between the components in which case it becomes equation 3.

$$L_{min} \leq \Sigma L_i \gamma_i P_i \leq \pi \qquad (3)$$

In equation 3 the index i is in reference to each component or free space. $L_i$ is a length of each component or free space, $\gamma_i$ is nonlinear coefficient of each component or free space, $P_i$ is peak power of the pump light as it enters each component or free space. In the contest of this embodiment, the non-linear coefficient $\gamma_i$ is value that is adjusted relative to the mode diameter of the light in each component. Additional optical components such as a filter or a tap may be placed in the free space area. In the context of this embodiment, $L_{min}$ is limited by the sum of the size of the components and their working distance, the sum of which is approximately 9 mm for some components.

Fourth Embodiment

FIG. 15 is a fourth embodiment of a FOPO light source 500 and is similar to FOPO light source 200 except that it may include a first polarization controller 506a between the seed laser 202 and a first port of a first wavelength division multiplexer (WDM) coupler 208a. The FOPO laser 500 may also include a second polarization controller 506b and/or an optical delay line 518 between the 10% output port of the power splitter 216 and the second port of the first WDM coupler 208a. The polarization controller will allow for non-PM fiber to be used. The optical delay line allows for a length of the FOPO ring to be optimized.

Fifth Embodiment

Figure 16:
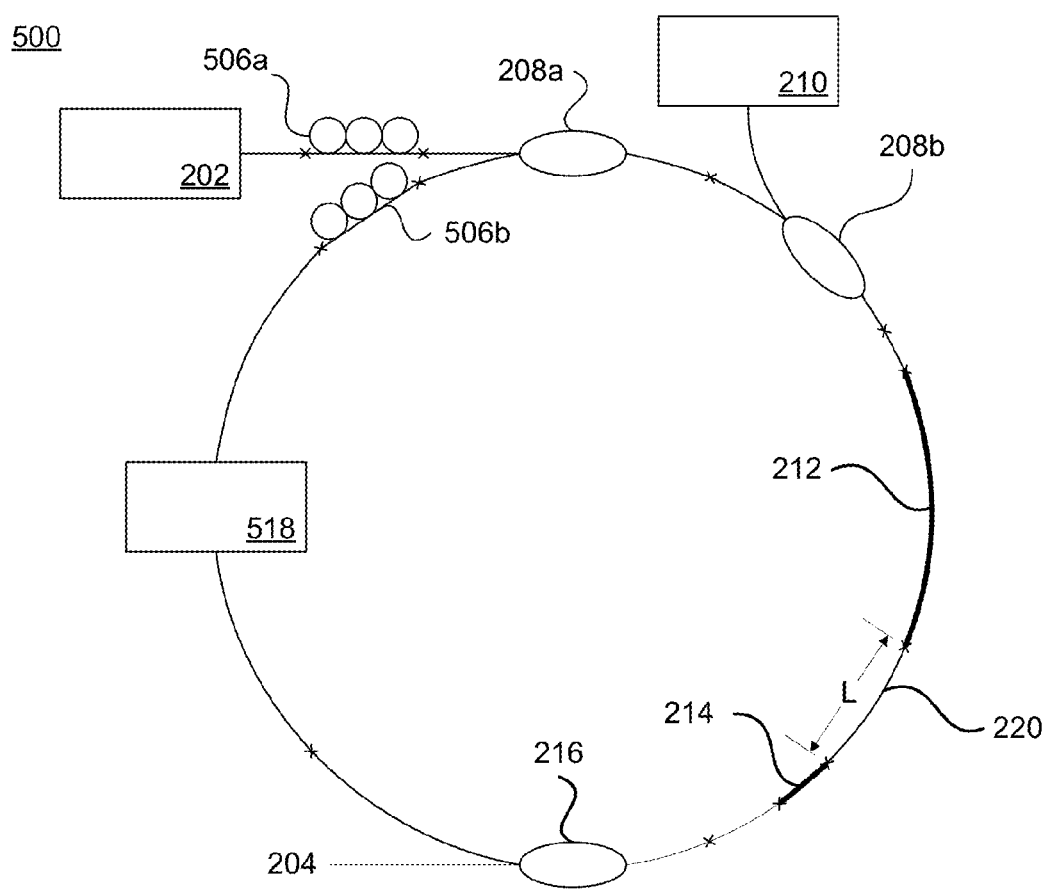
FIG. 16 is an illustration of a fourth alternative embodiment.
Figure 17:
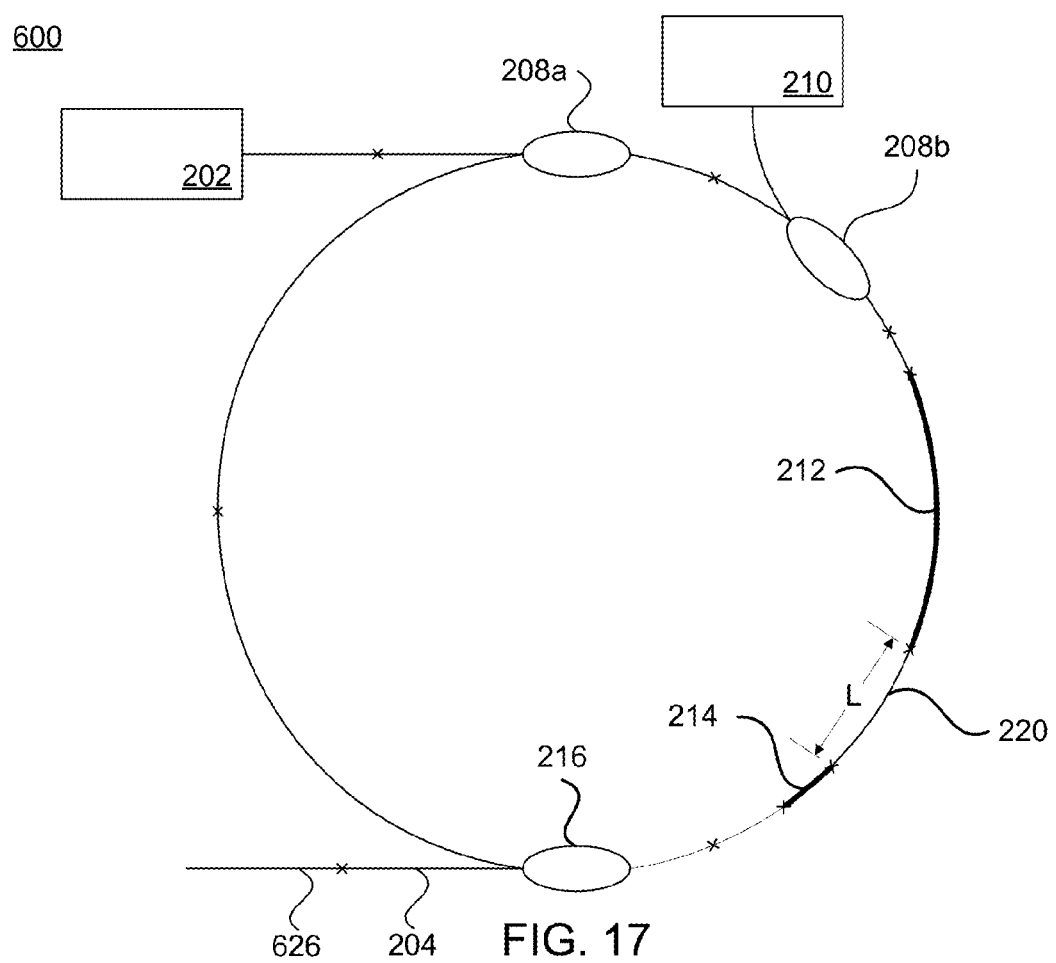
FIG. 17 is an illustration of a fifth alternative embodiment.

FIG. 16 is a fifth embodiment of a FOPO light source 600 and is similar to FOPO light source 200 except that it a third waveguide after the output port of the power splitter 216 a length of the third waveguide "I", pulse duration of the first pulse "t", and dispersion parameter of the second pulse "D" in the third waveguide satisfies the equation (4):

$$I \geq t/D \quad (4).$$

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An optical apparatus comprising:
an optical source that generates a first pulse with a first optical wavelength;
an optical amplifier that amplifies the first pulse and outputs an amplified pulse with the first optical wavelength;
a first waveguide that is connected to the optical amplifier which receives the amplified pulse;
a second waveguide that is connected to the first waveguide and receives the amplified pulse, wherein the second waveguide converts the energy of the amplified pulse into energy of a second pulse while a relative center position of the second pulse for the amplified pulse is crossing a center position of the amplified pulse in a first direction, wherein the second pulse has a second optical wavelength different from the first optical wavelength;
wherein the amplifier, the first waveguide, and the second waveguide form an optical loop which feeds the second pulse back to the amplifier, the first waveguide, and the second waveguide;
an output coupler to output a portion of the second pulse outside of the optical loop;
wherein the following equation is satisfied:

$$L_{min} \leq L \leq \pi/\gamma P,$$

in which a length of the first waveguide is L, a nonlinear coefficient of the first waveguide is $\gamma$, a peak power of the amplified pulse as it is received by the first waveguide is P, and a minimum length of the first waveguide is $L_{min}$.

2. The optical apparatus according to claim 1, wherein the energy of the first pulse is converted to the energy of the second pulse by a parametric process.

3. The optical apparatus according to claim 2, wherein the first pulse is used as a pump wave and the second pulse is an idler wave or a signal wave.

4. The optical apparatus according to claim 1, wherein the second waveguide comprises a photonic crystal fiber.

5. The optical apparatus according to claim 1, wherein the optical amplifier includes at least one fiber selected from the group of: double clad gain fiber, polarization maintaining double clad gain fiber, single mode gain fiber, and polarization maintaining gain fiber.

6. The optical apparatus according to claim 1, further comprising a third waveguide after the optical coupler in the optical loop;
wherein a length of the third waveguide is "I", a pulse duration of the first pulse is "t", and a dispersion parameter of the second pulse is "D" in the third waveguide which satisfy the following equation:

$$I \geq t/D.$$

7. The optical apparatus according to claim 1, wherein $L_{min}$ is 10 mm.

* * * * *